(12) United States Patent
Zirella

(10) Patent No.: US 6,405,409 B1
(45) Date of Patent: Jun. 18, 2002

(54) HANDLE COVER

(76) Inventor: Alan Brock Zirella, 51 Camp Woods Rd., Ossining, NY (US) 10562

( * ) Notice: Subject to any disclaimer, the term of this patent is extended or adjusted under 35 U.S.C. 154(b) by 0 days.

(21) Appl. No.: 09/503,590

(22) Filed: Feb. 14, 2000

(51) Int. Cl.[7] .................................................. A45F 5/10
(52) U.S. Cl. .............................. 16/421; 16/425; 16/430
(58) Field of Search ........................... 16/421, 411, 431, 16/422, 425, 430, 434

(56) References Cited

U.S. PATENT DOCUMENTS

| | | | |
|---|---|---|---|
| 614,173 A | 11/1898 | Kelly | |
| 775,662 A | 11/1904 | Lyon | |
| 1,226,403 A | * 5/1917 | Snyder | 16/411 |
| 2,146,415 A | * 2/1939 | Bradley | 16/431 |
| 2,287,329 A | 6/1942 | Santa Maria | |
| 2,294,197 A | 8/1942 | Moore | |
| 2,319,147 A | * 5/1943 | Mason | 16/421 |
| 2,371,639 A | * 3/1945 | Mason | 16/421 |
| RE22,749 E | * 4/1946 | Mason | 16/421 |
| 2,398,436 A | * 4/1946 | Mason | 16/421 |
| 2,488,309 A | * 11/1949 | Mason | 16/421 |
| 2,654,115 A | * 10/1953 | Kafer | 16/421 |
| 4,059,867 A | 11/1977 | Adamis | |
| 4,590,640 A | 5/1986 | Enersen | |
| 4,823,433 A | * 4/1989 | Curtis | 16/411 |
| 4,932,702 A | 6/1990 | Sweeny | |
| D311,294 S | 10/1990 | Litowitz | |
| 4,982,989 A | 1/1991 | Sweeny | |
| D337,053 S | 7/1993 | Oden | |
| D372,865 S | 8/1996 | Stowell | |
| D384,279 S | 9/1997 | Hepworth | |
| 5,771,536 A | * 6/1998 | Sieg et al. | 16/431 |
| 5,884,955 A | * 3/1999 | Pucillo | 294/171 |

OTHER PUBLICATIONS

Duluth Trading Company Catalog showing cushioned bucket handle and padded handle;g.

* cited by examiner

Primary Examiner—Lynne H. Browne
Assistant Examiner—Doug Hutton
(74) Attorney, Agent, or Firm—Oppedahl & Larson LLP

(57) ABSTRACT

A handle cover for fitting over a wire bail handle affixed to a carriable container which offers several advantages over prior designs. The handle is designed to fit over the wire bail, whether or not a hollow tubular sleeve through which the wire bail passes is present, and can interact with this sleeve when present. Such interaction not only allows the handle cover to be adaptable to various wire bail handles, but can also provide additional stabilization of the handle cover relative to the bail. The handle cover is formed from two body members, at least one of which has a channel formed therein for receiving the wire bail. This channel has two end portions and a central portion. The central portion is wider than the end portions, to receive a hollow tubular sleeve if present on the bail.

2 Claims, 4 Drawing Sheets

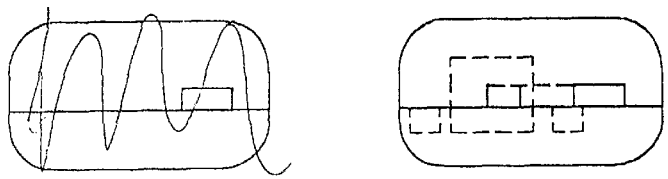
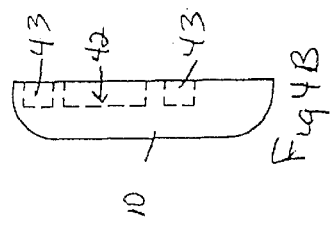
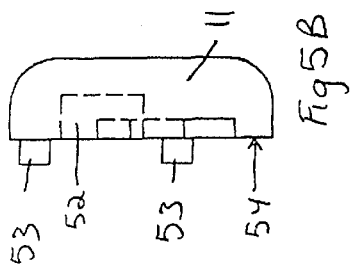
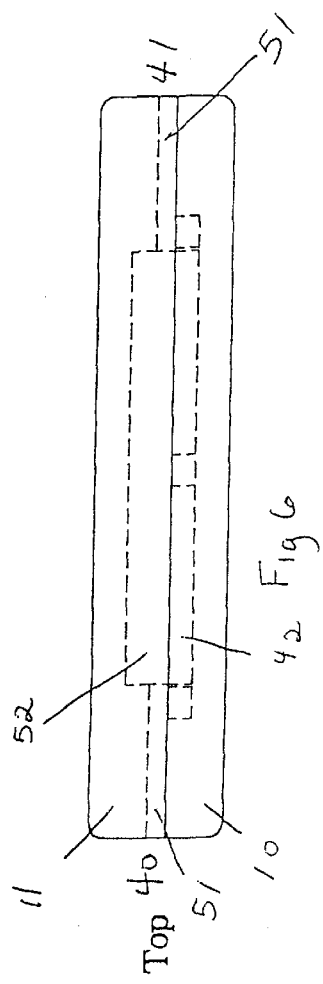
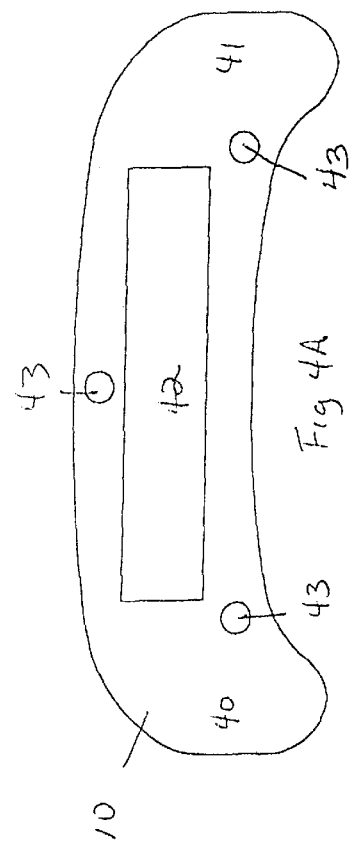
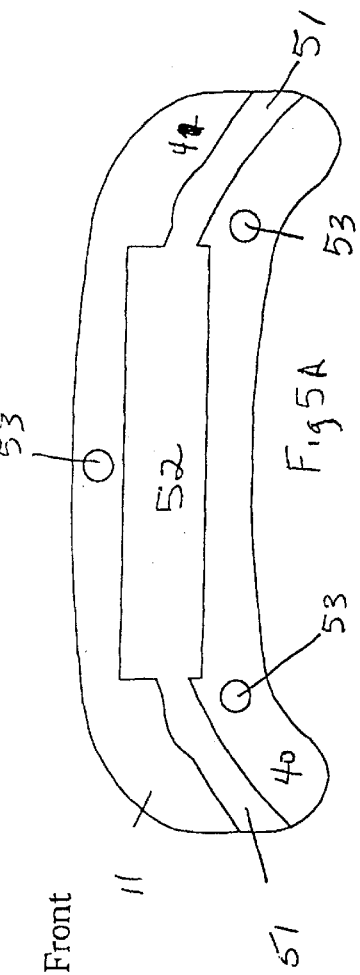

HANDLE COVER

BACKGROUND OF THE INVENTION

This application relates to a removable handle cover for placement over a handle formed from a wire bail.

Many carriable containers such as buckets, utility trays and the like come with a handle formed from a wire bail. Such wire bails are uncomfortable to hold, particularly when carrying a heavily-loaded bucket or other container. To overcome this difficulty, some buckets or containers are sold with a small plastic tube threaded onto the wire bail. This provides some improvement, but does not fully overcome the problem.

Numerous other designs have also been described for handles which fit over the handles of carriable containers, including those disclosed in U.S. Pat. Nos. 614,173, 775, 662, 2,654,115, 2,146,415, 2,287,329, 2,294,197, 2,319,147, 2,371,639, 2,398,436, 4,059,867, 4,590,640, 4,982,989, 4,932,702, U.S. Pat. No. Des. 337,053 and U.S. Pat. No. Des. 384,279.

SUMMARY OF THE INVENTION

The present invention provides a novel design for a handle cover for fitting over a handle affixed to a carriable container which offers several advantages over prior designs. The handles is designed to fit over the wire bail, whether or not a hollow tubular sleeve through which the wire bail passes is present, and can interact with this sleeve when present. Such interaction not only allows the handle cover to be adaptable to various wire bail handles, but can also provide additional stabilization of the handle cover relative to the bail. The handle cover of the invention comprises first and second body members, wherein (a) each body member has a first end and a second end and an interior face and an exterior face, and wherein at least the first body member has a channel formed on the interior face of the first body member, said channel comprising two end portions and a central portion disposed between the two ends portions and said channel extending from the first end to the second end of the first body member;

(b) the end portions of the channel have a first width and the central portion of the channel has a second width which is greater than the first width, (c) the end portions and the central portions are substantially coaxial, whereby the channel can receive a wire bail with a hollow tubular sleeve when the hollow tubular sleeve disposed within the central portion, and closure means for holding the first and second body members together, with the interior face of the first body member adjacent to the interior face of the second body member.

BRIEF DESCRIPTION OF THE DRAWINGS

FIGS. 4A and 4B show interior and side views of one body member of the handle cover of the invention;

FIGS. 5A and 5B show interior and side views of the other body member of the handle cover of the invention;

FIG. 6 shows a top view of the handle cover of the invention, with phantom lines showing the position of the channel and depression and the pins and holes for joining the two body members into the handle cover;

DETAILED DESCRIPTION OF THE INVENTION

The present invention relates to a handle cover for fitting over a handle affixed to a carriable container. As used herein, the term "carriable container" refers without limitation to containers such as buckets, utility trays and the like which have a handle formed from a wire bail, and optionally a hollow tubular sleeve through which the wire bail passes. The shape of the wire bail may be curved, or it may be bent into a shape with three essentially straight sides—two legs which extend upward from the container and a cross member connecting the two legs. In the specification and claims of this application, this latter shape is referred to as a "rectangular handle."

Figure 3:
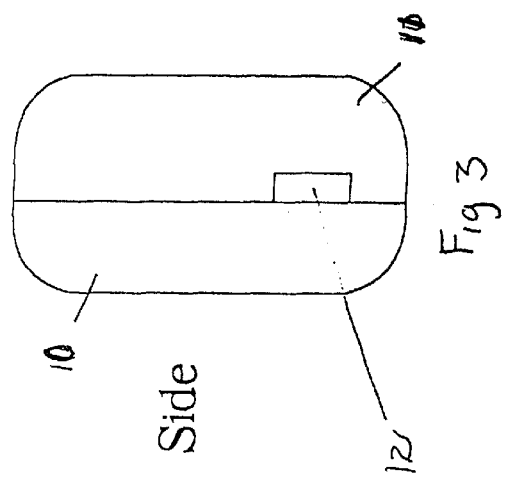
FIG. 3 is a side, exterior view of the handle cover of the invention.
Figure 2:
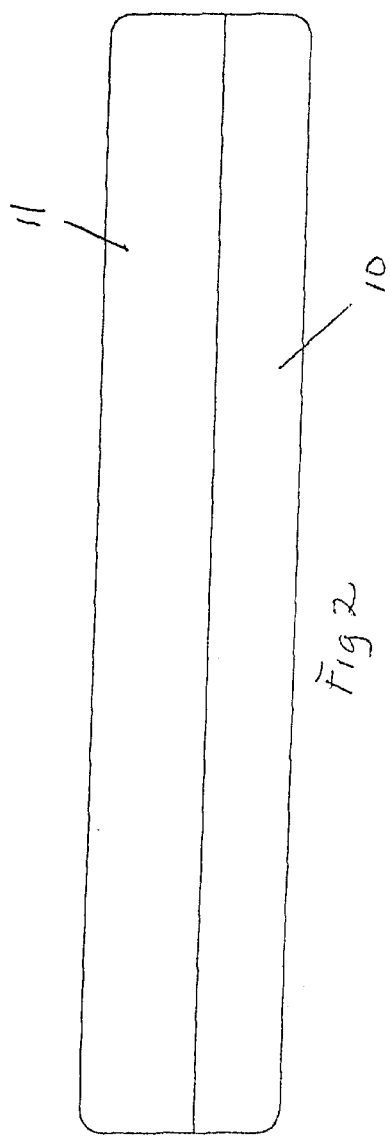
FIG. 2 is a top exterior view of the handle cover of the invention.
Figure 1:
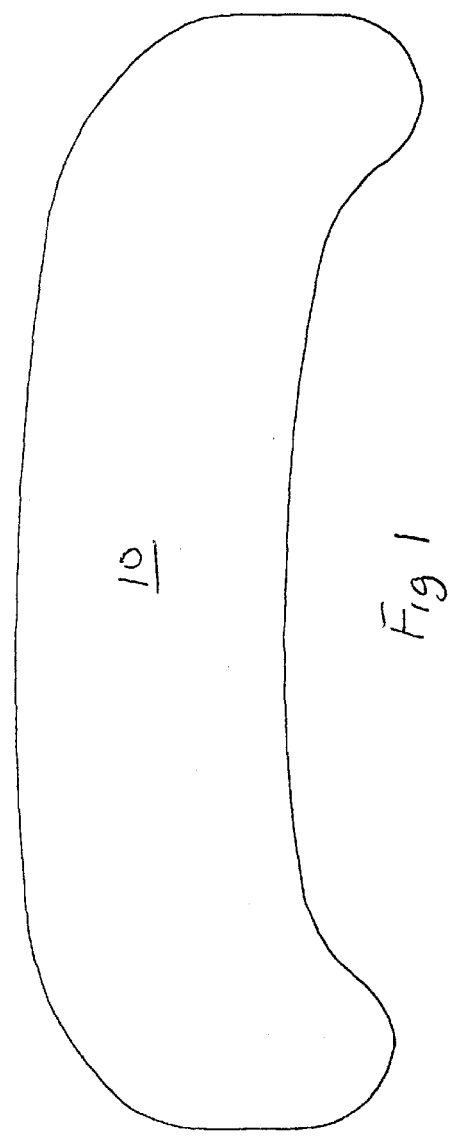
FIG. 1 is a front, exterior view of the handle cover of the invention.

FIGS. 1–6 show various views of a first embodiment of the present invention adapted for use with a carriable container having a curved bail. As shown in FIGS. 1–3, the handle cover of the invention is formed from two body members 10, 11 which fit together over the wire bail, which is accommodated in a channel 12 which opens to the exterior at each end of the cover. The exterior surfaces may be plain, as shown, or may include texturing to improve the grip of the user on the handle cover, or contours to adapt the exterior shape to the shape of a human hand.

FIGS. 4A and 5A show the interior surfaces of the two body members which face each other when the handle cover is assembled for use. Each of the body members 10, 11 have a first end 40 and a second end 41 and an interior face and an exterior face. Body member 11 (FIG. 5) has a channel formed on the interior face of the first body member, said channel comprising two end portions 51 and a central portion 52 disposed between the two ends portions 51. The central portion 52 is wider than the two end portions 51 to accommodate the hollow tubular sleeve, if present around the bail of the carriable container. As shown, the channel extends from the first end 40 to the second end 41 of the first body member 11. Body member 11 also has pins 53 extending outwards from the interior face 54 as is most clearly shown in FIG. 5B.

Body member 10, as shown in FIG. 4A has a depression 42 formed therein which corresponds to the central portion 52 of the channel formed in body member 11. Body member 10 also has holes 43 which correspond to the pins 53 of body member 11. The two body members are assembled with the interior faces in contact with one another, and with the bail disposed within the channel. (See FIG. 6) The central portion 52 and the depression 42 are aligned to provide a cavity in which the hollow tubular sleeve, if present, is received. The pins 53 fit within the holes 43 to secure the two body members together. A groove or other means may be provided on the exterior of one or both of the body members, (for example on body member 10, FIG. 3) to facilitate separation of the two body members.

Figure 7A:
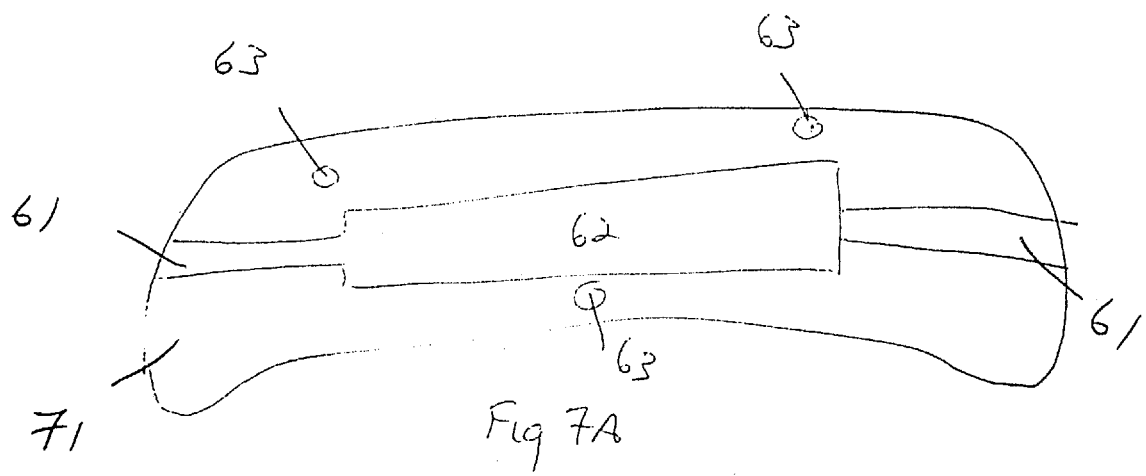
FIGS. 7A and 7B show views of the interior surfaces of the two body members in accordance with a second embodiment of the invention.
Figure 7B:
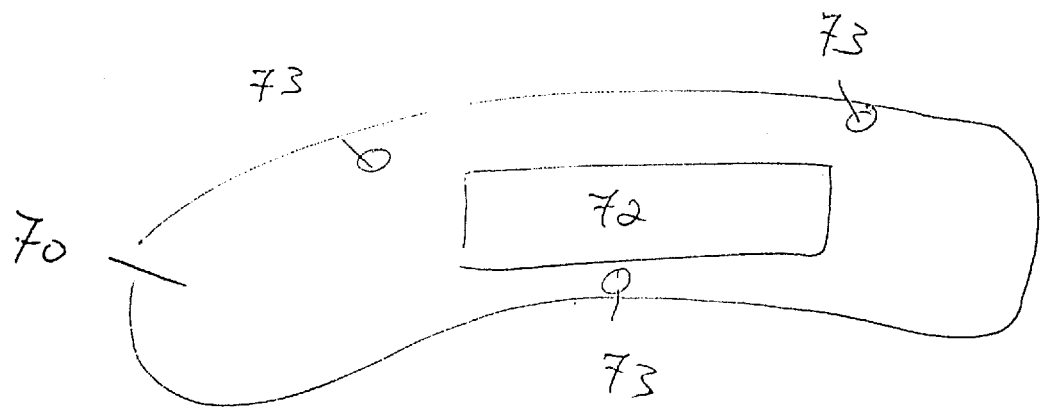

FIGS. 7A and B show the interior surfaces of two body members in accordance with alternative embodiment of the invention adapted for use with a rectangular handle. In this case, body member 70 (FIG. 7B) has a depression 72 and holes 73 comparable to those of body member 10. Body member 71 has a channel with a central portion 62 and end portions 61, and pins 63 in positions corresponding to holes 73. The end portions 61 of the channel in this embodiment are substantially straight to accommodate the shape of the rectangular bail.

Figure 8:
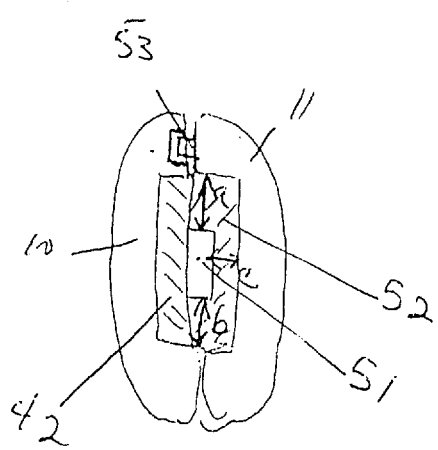
FIG. 8 shows a cross sectional view through the center of a handle cover in accordance with the invention.

In each of these embodiments, the end portions of the channel have a first width and the central portion of the channel has a second width which is greater than the first width, and the end portions and the central portions are substantially coaxial. As used herein, the term "substantially coaxial" means that at the intersection of the central portion and the end portions, some portion of the central portion opening extends beyond the end portion in each direction such that there is space within the central opening to receive the hollow tubular sleeve if present on the bail of the carriable container as illustrated in FIG. 8. It does not require that the dimensions indicated by a, b and c in FIG. 8 be equal, merely that each dimension has some non-zero value. In general, each of these values is at least about 0.25 inches (0.64 cm) to accommodate the width of a normal tubular sleeve when the hollow tubular sleeve is disposed within the central portion and the aligned depression.

While the embodiments discussed above show a depression in alignment with the central portion of the channel to create a cavity for receiving a hollow tubular sleeve if present, this depression is optional. If the depression is omitted, then the central portion of the channel needs to be deep enough to receive the tubular sleeve, and the end portions of the channel need to be deep enough to allow accommodate the wire bail plus the thickness of the sleeve material.

Figure 9:
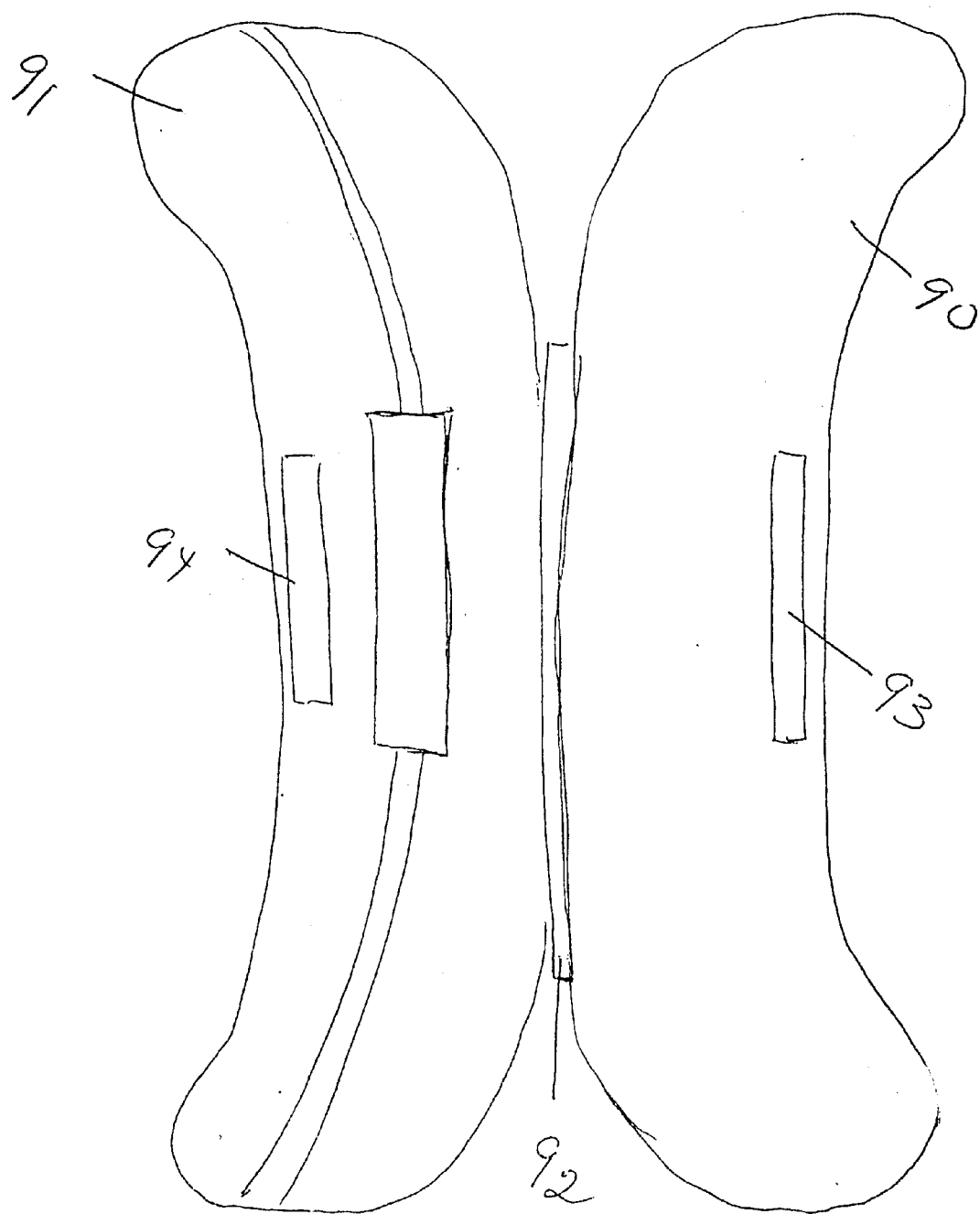
FIG. 9 shows a further embodiment of the invention with hinged body members.

In the embodiments shown above, the two body members are held together around the wire bail by a combination of holes and pins. It will be appreciated that the number of pin/hole pairs could be varied, and the position of holes and pins could be changed. In addition, each body member might have both pins and holes. Furthermore, alternative closure means for holding the first and second body members together, with the interior face of the first body member adjacent to the interior face of the second body member could be employed. Other closure means could also be employed, for example snap closures, screws, a ridge and matching groove (such as are used on zip-closure plastic bags) and matching hook and loop fasteners (for example VELCRO fasteners) affixed to opposing faces of the interior surfaces of the body members. Combinations of hooks and eyes (to receive the hooks) disposed on opposed locations on the exterior edges of the body members could also be used, although care should be taken to avoid creating a bump or ridge which would make carrying a loaded container uncomfortable. In addition, a shown in FIG. 9, the handle cover of the invention can be made with a hinge 92 connecting the two body members 90, 91 with a closure means of any of these types (for example hook and loop fastener pads 93, 94) for holding the two pieces together in a closed position. The hinge 92 can be formed integrally with the body members 90, 91 for example as a living hinge when the handle is made out of plastic, or may be a separate hinge portion glued or otherwise affixed to the body members.

The handle cover of the invention can be suitably made out of a variety of materials. Preferred materials are wood and plastic because of their low cost, durability and easy workability. The handle covers might also be made out of metal.

The handle covers of the invention provide an adaptable solution to covering a wire bail handle, whether or not it has a hollow tubular sleeve disposed on the bail. In addition, particularly in the embodiment for use with a curved bail, the end portions of the curved channel and the central portion work in concert to prevent the handle cover from shifting laterally or twisting axially around the wire bail. This provides for a more comfortable and stable grip on the bucket handle.

What is claimed is:

1. A handle cover for fitting over a handle affixed to a carriable container, wherein the handle affixed to the container comprises a wire bail and optionally a hollow tubular sleeve through which the wire bail passes, comprising first and second body members, wherein
(a) each body member has a first end and a second end and an interior face and an exterior face, and wherein
(i) the first body member has a channel formed on the interior face of the first body member, said channel comprising two end portions and a central portion disposed between the two ends portions and said channel extending from the first end to the second end of the first body member; and
(ii) the second body member has a depression which corresponds to the central portion of the channel in the first body member, but no channel or depression corresponding to the end portions of the channel in the first body member;
(b) the end portions of the channel of the first body member have a first width and the central portion of the channel has a second width which is greater than the first width,
(c) the end portions and the central portions of the first body member are substantially coaxial, whereby the channel can receive a wire bail with a hollow tubular sleeve when the hollow tubular sleeve disposed within the central portion,
a hinge connecting the first and second body members, and
closure means for holding the first and second body members together, with the interior face of the first body member adjacent to the interior face of the second body member.

2. A handle cover for fitting over a handle affixed to a carriable container, wherein the handle affixed to the container comprises a wire bail and optionally a hollow tubular sleeve through which the wire bail passes, comprising first and second body members, wherein
- (a) each body member has a first end and a second end and an interior face and an exterior face, and wherein the first body member has a channel formed on the interior face of the first body member, said channel comprising two end portions and a central portion disposed between the two ends portions and said channel extending from the first end to the second end of the first body member, and wherein the second body member has a depression which corresponds to the central portion of the channel in the first body member, but no channel or depression corresponding to the end portions of the channel in the first body member,
- (b) the end portions of the channel have a first width and the central portion of the channel has a second width which is greater than the first width,
- (c) the end portions and the central portions are substantially coaxial, whereby the channel can receive a wire bail with a hollow tubular sleeve when the hollow tubular sleeve disposed within the central portion, and closure means for holding the first and second body members together, with the interior face of the first body member adjacent to the interior face of the second body member.

* * * * *